United States Patent [19]

Ehrenfried et al.

[11] Patent Number: 4,967,594

[45] Date of Patent: Nov. 6, 1990

[54] SHEATHING AND VENTING OF RESISTANCE-TAPE LEVEL SENSOR

[75] Inventors: Albert D. Ehrenfried, Maynard; John A. Gunnarson, Concord; William E. Pierce, Winchendon; Thomas C. Thorstensen, Westford, all of Mass.

[73] Assignee: Metritape, Inc., Littleton, Mass.

[21] Appl. No.: 384,266

[22] Filed: Jul. 24, 1989

[51] Int. Cl.⁵ ...................... G01F 23/18; H01C 1/032
[52] U.S. Cl. ....................................... 73/301; 338/256
[58] Field of Search ...................... 73/301; 338/13, 256

[56] References Cited

U.S. PATENT DOCUMENTS

| | | | |
|---|---|---|---|
| 2,415,187 | 2/1947 | Moore | 338/256 X |
| 3,551,090 | 5/1970 | Ehrenfried et al. | 73/301 |
| 3,583,221 | 6/1971 | Ehrenfried et al. | 73/301 |
| 3,599,139 | 8/1971 | Low | 338/256 X |
| 3,792,407 | 2/1974 | Ehrenfried et al. | 338/13 |
| 4,816,799 | 3/1989 | Ehrenfried et al. | 338/13 |

Primary Examiner—Daniel M. Yasich
Attorney, Agent, or Firm—Weingarten, Schurgin, Gagnebin & Hayes

[57] ABSTRACT

Sheathing for a resistance-tape level sensor which provides a multiplicity of enclosing envelopes for guarding the critical inner electrical sensing element, and multiple venting paths for respiration and pressure-equalization of chambers formed by the separate envelopes.

14 Claims, 3 Drawing Sheets

SHEATHING AND VENTING OF RESISTANCE-TAPE LEVEL SENSOR

FIELD OF THE INVENTION

This invention relates to material level sensors, and more particularly to resistive fluent material level sensors for the monitoring of liquids and slurries.

BACKGROUND OF THE INVENTION

This invention relates to a unique sensing device, based upon the resistance-tape principle, which is known commercially and described in the literature under the trademark "Metritape" sensor, and which is the subject of several U.S. Pat. Nos., including 3,511,090; 3,583,221; and 3,792,407.

The Metritape resistance-tape sensor comprises an elongated metallic base strip having electrical insulation on the edges and back of the strip to define an uninsulated zone along the frontal length of the base strip, and a resistance wire, or ribbon, helically wound around the insulated base strip, with the helical turns bridging the insulated edge portions and being spaced away from the underlying uninsulated frontal zone of the base strip.

This sensor structure is enclosed within a continuous, flexible polymeric or other protective sleeve which provides a clean and dry inner chamber for the wound electrical element. The sensor is disposed vertically within a tank or vessel containing the liquid or fluent material, the level of which is to be monitored. The pressure of the material surrounding the immersed sensor causes deflection of the enclosing sleeve and this presses helical turns in the immersed portion of the sensor into engagement and electrical contact with the underlying base strip, such that an electrical resistance proportional to height of the voide space above the material is provided.

Applications for this elongated resistance-tape sensor have ranged from the gauging of short land-based tanks, to deep oil and ballast compartments on ocean-going supertankers; from tanks open to atmosphere, to closed heavy-walled tanks containing several atmospheres of pressure; from tanks never filled above 98% of level, to tanks that may be overfilled to heights that impart an overpressure upon tank and sensor components; from tanks containing water and benign liquids, to those holding corrosive chemicals, aggressive solvents, and slurries and sewage having high solids content.

Within this wide application range, it is the role of the outer sensor envelope, or sheath, to isolate the critical inner electrical element from the outer surrounding material and from the vapors that may exist above the gauged material. In addition to resisting corrosion, the outer sheath must guard against the penetration of liquid and vapor by leakage, by seepage through pinholes and pores, and by permeation of liquid and vapor through the molecular structure of the one or more surrounding layers.

The molecular structure of all materials allows the penetration and permeation of gases and liquids to some degree, with the extent of such penetration being dependent upon physical properties of the material itself and upon its thickness. Layers of materials of elastomeric or polymeric nature, may allow liquid and vapor phases to pass through the structure to a limited degree and in either direction. The permeation of vapors and liquids through glass and metals, however, is extremely low, and thus thin metal foils, vacuum-deposited metallic particles, and elastrostatically-deposited glass particles are used as barriers to reduce the permeation of liquids and vapors through thin membranes.

While serving as an effective barrier, the outer protective layer, or layers, of a resistance-tape sensor must also remain compliant to serve as a flexing pressure-receiving diaphragm, yet be sufficiently rigid to bridge across helix turns, and deliver to them sufficient actuation force to bring them firmly into contact with the underlying base strip.

The outer cover of a resistance-tape sensor may take two general forms:

(1) A single composite sheath comprised of a multiplicity of thin film layers, held intimately together over their entire surfaces with solvent-resistant adhesive. This structure has only a single internal air cavity, and allows the use of special permeation barrier films as part of the composite jacket structure. However, the single multi-layer sheath is dependent upon long-term solvent-resistance of the adhesive material used to hold together the jacket layers; and this style of sensor has been subject to delamination by certain crude-oil components, gasoline additives and chemical solvents.

(2) An inner sensor having a first protective layer, inserted into a second outer sheath comprised of a formed thermoplastic material, which is heat sealed over its full length and at the bottom end, and is thus not dependent upon adhesives for the integrity of this outermost envelope. The present invention deals with important extension and refinement of this multi-wall form of sensor sheathing and its proper venting to surrounding atmosphere through a capillary breather/equalizer assembly.

Accordingly, it is an object of this invention to provide an improved outer protective sheath surrounding the electrical system of a resistance-tape material-level sensor.

Another object is to provide multiple barrier layers which cooperate to resist entry of corrosive liquid or vapor into the critical inner sensor chamber.

A further object is to provide multiple independent sheaths which operate together mechanically to deliver hydrostatic pressure efficiently to the discreet helix windings, bringing them into firm contact with the underlying conductive base strip.

Recognizing that all materials are penetrated to some degree by vapors and liquids, it is another object of this invention to provide internal and external sheathing layers that are relatively impervious to permeant vapors and condensate liquids.

A further object is to provide multiple internal chambers, each having venting means for pressure-equalization to surrounding atmosphere, and for the expulsion of permeant vapors by the pumping action of rising liquid level.

Another object of this invention is to utilize the low-permeation properties of glass and metallic materials as a means for reducing the permeation of vapors and liquids through the thin polymeric membranes used as inner or outer sheaths of resistance-tape sensors.

Yet another objective is to design an outer sheath for a resistance-tape sensor which is mechanically rugged and resistant to damage in the handling, transit and use of these sensors.

SUMMARY OF THE INVENTION

In brief, the present invention provides multiple enclosing and protective sheaths around the critical inner electrical system of a resistance-tape sensor, each sheath fully closed along its length and at the bottom; and also provides suitable venting means for equalizing the internal sensor chambers to surrounding pressure, and for expelling permeant vapors during the normal process of tank level cycling.

Material compositions of enclosing sheaths are selected to resist corrosion by the liquids and vapors to which they are exposed, and to minimize the absorption and permeation of the liquids and vapors present. Sheathing materials are further selected for their compliance and for their ability, in combination, to deliver surrounding hydrostatic pressure efficiently to resistance turns of helix wire and thereby to facilitate the effective closing of sensor contacts.

Venting means for the pressure-equalization of internal sensor chambers are described, including breathing means for the expulsion of corrosive vapors and for achieving responsiveness to external liquid waves and to changes in external ambient pressure.

DESCRIPTION OF THE DRAWINGS

The invention will be more fully understood from the following detailed description taken in conjunction with the accompanying drawings, of which.

DETAILED DESCRIPTION OF THE INVENTION

Figure 1:
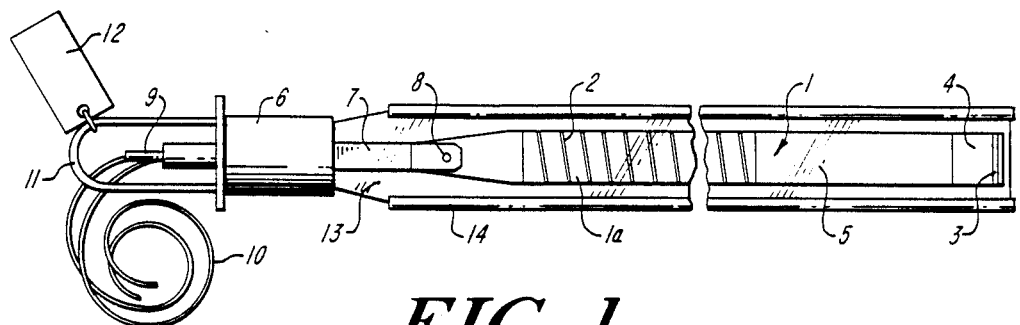
FIG. 1 is a view of the elongated resistance-tape sensor, with elements shown and called out from sensor top to bottom.

The resistance-tape material level sensor with which this invention is employed is sold commercially and known as a "Metritape" sensor. An overall view of this sensor is shown in FIG. 1, and is seen to comprise a lineal tape-like section 1 that may range typically from three to over 100 feet in length. In the interior of this section is a helical resistance winding 2 that is normally insulated from an underlying base strip conductor 1a. At the sensor bottom end 3, the helix winding is welded to the stainless steel base strip to provide an electric current path, and electric leads 10 are brought through the sensor head 6 that connect to the base strip and to the top of the helix resistance winding. Thermoplastic sheath 5 is heat sealed at the edges and bottom 3 to exclude liquid; and an internal reinforcing pocket 4 is provided to receive the bottom end of the stainless steel base strip, and to prevent puncture of outer sheaths thereby. Multiple layers of external sheathing may be utlized to enclose the inner electrical system 1, and may include a sheath of corrosion resistant material over the full sensor length or at the bottom end of the inner sensor only.

An external sensor boot or sheath 13 extends the entire length of the tape-like sensor, and may be protected on the edges by bumper tubing 14 such as is described in U.S. Pat. No. 4,816,799 or may be protected by a formed channel to which the tape-like sensor portion is engaged, and which serves to guard the sensor back, two edges and, in part, the sensor frontal surface.

Also shown in FIG. 1, the lineal resistive sensor and its outermost protective sheath engage a top mechanical termination, or sensor head 6, attaching first to a protruding tongue 7 through a shear pin 8. The outermost sensor sheath extends over the tongue 7 and enters a lower recess of the mechanical head 6, where it is captured by a compression seal as described in U.S. patent application Ser. No. 07/325,139, filed Mar. 17, 1989 and allowed Feb. 12, 1990, Batch No. C92.

At the top of the sensor head, one or more breather tubes 9 emerge these communicating with common or separate internal spaces within the sensor sheathing. The breather tube, or tubes, attach to one or several capillary breather/equalizer structures, which are the subject of earlier patents of the present assignee and are briefly described and illustrated hereinafter.

Also emerging from the top of the sensor are leadwires 10 which attach internally to the level sensing helix winding and to the supporting base strip, and allow the reading of unshorted resistance value, represents the distance from tank top down approximately to the liquid surface. If one or several temperature detectors are mounted within the sensor envelope, their leadwires are also brought out through the sensor head, allowing temperature at specific detector locations within the storage vessel to be measured.

Attached also at the sensor head is a lifting handle 11 and a tag 12 which contains instructions and calibration values pertaining to the specific sensing element and used for calibration purposes.

Figure 2:
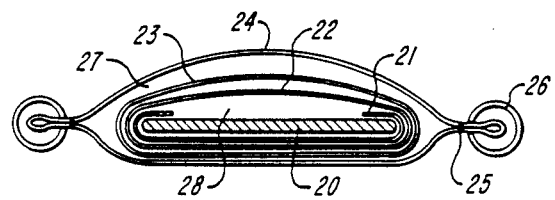
FIG. 2 is a cross-sectional view through the sensing portion of the tape-like structure, showing principally the inner and outer sheathing layers and the internal air chambers formed thereby.

A cross-sectional view of a representative sensor within the scope of the subject invention is shown in FIG. 2. Here, stainless steel base strip 20 is shown as the backbone about which the tape-like sensor is constructed. To base strip 20 is adhered a thin film insulation 21 which covers the edges and back of the conducting base strip. Around the insulated base strip is applied the helical resistance winding 22 which is held away from base strip 20 by the insulation 21.

A first sheath 23 is shown surrounding the inner electrical winding system and acts as a protection against the intrusion of corrosive liquids and vapors which could contaminate the electrical contacts systems operating between helix 22 and base strip 21. Sheath 23 may consist of one or several layers of protective jacketing, fused or adhered together over their full surfaces.

In the embodiment illustrated in FIG. 2, the electrical system, enclosed by sheathing 23, is inserted into a flat, thermally-shaped tube or sheath 24 which extends outward at the edges to provide mechanical bumpers that fend off the internal diameter of a surrounding still pipe, thus protecting the critical inner element from potential damage.

Extended edges 25 of the outer sheathing may also be reinforced with split tubing 26 which adds further edge protection in the manner described in U.S. Pat. No. 4,816,799. Outer sheathing 24 may also be laminated of several layers of sheathing material.

When the sensor structure of FIGS. 1 and 2 is mounted vertically within a storage vessel, the liquid being gauged will rise on the sensor, exposing outer sheath 24 to a liquid phase up to the surface, and to a vapor phase for the remaining sensor portion above the liquid.

If there is permeation of liquid or vapor through the outermost sheath 24, resultant permeant vapor or condensed liquid will gather in the interspace 27 formed between the sheaths 23 and 24. Inner sheathing 23 is therefore designed to resist further permeation or corrosive attack by the permeant, which is generally of lower concentration that the original material held in the storage vessel.

Wetting, absorption and eventual permeation of liquids and vapors through thin material membranes are complex processes, and in some installations are not recognized as being critical. Early resistance-tape sensors were designed under the impression that the outermost sheath layer would serves as an effective barrier against the penetration of either liquids or vapors into the critical inner sensor chamber. Under this assumption, the inner sheath layer 23 was not closed at the bottom end and an open, venting slit was provided near the sensor top. As a result, vapors permeating the interspace 27 were found to condense and gather at the bottom of the sensor sheath 24, and to chemically attack the helix wire and the welded connection between helix wire and base strip at the bottom end of the sensor.

Likewise, at the top of the sensor, the opening provided for venting furnished a path for corrosive permeant vapors to enter the top of the innermost sensor and to attack the helix wires and the electrical connection of resistance helix to leadwire at the top of the sensor. Thus, corrosion was found to occur which could result in open-circuiting of the helix or leadwire connection, rendering the sensor inoperative.

Upon detailed study of the process of permeation and resultant effects upon the resistance-tape sensor, the measures described herein, were developed and have resulted in the significantly improved structure.

Speaking now of the sensor sheathing refinements, first measures were taken with the innermost sheath 23, which is contiguous with the critical inner electrical winding system. This sheath is longer than the sensor and is closed and folded at the bottom end (FIG. 1), so that this region of the inner electrical sensor is guarded against vapor penetration and against attack by the condensated permeant. Because of the prospect of vapor condensing and collecting by gravity at the bottom of interspace 27, additional adhered outer jacketing, such as element 5 in FIG. 1, is either extended throughout the full length of the resistance-tape sensor or, for very long sensors, traverses a portion of the bottom of the sensor. This jacket 5 can be of Teflon film with pressure-sensitive adhesive or, where greater economy is required, of polypropylene film, both materials being generally resistant to corrosive attack. This jacket 5 (FIG. 1) is also closed at the bottom end of the sensor resulting in a labyrinthian seal which effectively resists the penetration of either vapor of liquid phases at this critical location.

Consistent with the teaching of this invention, other films and composite materials may be incorporated in sheath 23 to improve the sealing and permeation resistance of this membrane. For example, it has been shown that metallic materials are highly resistant to permeation and may be used either as thin metallic foils, or as vapor-deposited metallic particles, the latter performing effectively to block vapor migration, even though the particles are of very small size and there may be small interspaces between particles sufficient to allow light to pass, but not to allow most gaseous vapors to pass. Thus, based upon this knowledge, certain layers of sheath 23 may be of thin metallic foil or of thin polymers to which metallic particles have been vapor deposited so as to form a layer highly resistant to liquid or gaseous permeation.

Outermost sheath 24, being in direct contact with the gauged liquid and the associated vapors, represents the first line of defense against penetration of damaging substances into the interior of the resistance-tape sensor. Thus, this layer may be formed of a composite of materials, including polymers, elastomers, foils and vapor-deposited films, adhered or fused together to from a multi-layer structure. These homogenous or composite films are then formed into a thermally sealed boot such as by edge and bottom sealing methods that are common practice in the fabrication of food pouches and packages. Multi-layer composites are effective to the extent that the adhesive which adheres the layers together is resistant to corrosive or solvent attack. Edge beads may be applied to provide a fused enclosure of the edge seams and, in addition, a beneficial mechanical bumper. Composite sheaths, with exposed edge seams, can be effective and of long duration in the gauging of water and water-based materials, such as sewage. Also, adhered structures can be used in certain petroleum products, food products, vegetable oils and other liquids that do not contain aggressive solvent components.

For highly corrosive liquids and aggressive solvents, a thermoplastic outer sheath, which does not rely upon the functioning of adhesives, is found to be most suitable. As shown in FIG. 2, such outer sheath 24 may take the form of an extruded thin-wall tube which has been flattened and then edge sealed to provide a structure that has the properties of the selected thermoplastic throughout. Such thermoplastic sheath, which has been used on resistance-tape sensors, is Teflon fluorocarbon material, of approximate 10 mm wall thickness, and having an outer surface which resists the clingage and adhesion of materials in which the gauge may be used. Such thermoplastic sheath must be free of pinholes and other such flaws, and rigorous testing must be performed upon outer sheath 24 during sensor assembly to insure that it is sound and free of leakage.

Figure 3:
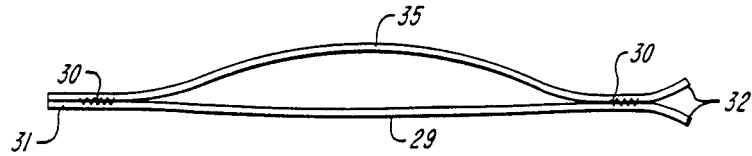
FIG. 3 is another cross-sectional view showing an outer sheath fabricated of thermoplastic film layers, heat sealed in the vicinity of the outer edges, and optionally edge-protected by thermoplastic forming or embedment.

Outer sheath 24 can also be formed of two layers of thermoplastic film, such as Teflon or polypropylene, and fabricated into a flat enclosing tube by the application of heat seals at or near each edge. In FIG. 3, thin films 35 and 29 are thermally joined at the edges with seals 30. The illustrate construction allows films 35 and 29 to be of differing thickness, and to have vapor-deposited metal on the inner surface; and they may be of differing materials so long as they can be joined in a strong thermal bond.

Figure 3A:
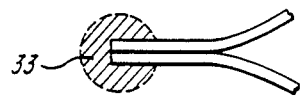
FIG. 3A is a cross-sectional view of an alternative edge configuration of the outer sheath.

Film edges 31 may extend beyond thermal welds 30 either in the straight fashion show, or may be flared as in edges 32 to provide a means for securing add-on edge protection, such as tubings 26 of FIG. 2. The film edges may also be thermally fused and augmented in such away as to form an enlarged bead 33 shown in FIG. 3A. Such construction provides seam protection, as well as mechanical edge protection, by the film material itself or by additional material which may be adhered to, or extruded upon, the sheath edges during or after the performance of thermal seaming.

It is essential that all open spaces within a resistance-tape sensor be vented through some form of transition breather/equalizer and thereafter returned to the same pressure that surrounds the exterior of the sensor. The capillary breather/equalizer assembly is described in U.S. Pat. No. 3,583,221 and shown in FIGS. 4A, 4B and 4C. Two basic purposes are served by this assembly, mounted external to the tank. First, by the provision of a venting path, interior air spaces within the sensor are not air locked, but are instead allowed to expel air as liquid level rises and hydrostatic compressive forces flatten the sensor strip and bring electric contacts into a closed condition over substantially the entire length of the immersed sensor. Conversely, as liquid level falls, sensor helix contacts are no longer pressed together and their spring action causes them to open up. For this to happen, interior sensor spaces must inhale air to fill the chambers that are normally open when liquid is absent from the storage vessel. With this inhaling action, sensor sheaths open up, and helix electric contacts are likewise allowed to open and to recover from their prior shorted condition.

The inhalation and exhalation process (or respiration) of the resistance-tape sensor is facilitated by a storage reservoir in which is held a clean and dry gas volume which, when inhaled, will not corrode and damage the sensor contacts. In addition, as gas is expelled from interior sensor spaces, any permeant vapors that may have passed through the sheaths will be substantially expelled into the breather/equalizer volume and absorbed by the cleaning and drying chemicals contained within the breather structure.

The second purpose for the capillary breather/equalizer is to vent interior sensor volumes to the gas pressure external to the sensor and acting upon the outermost sensor sheath. Thus, external pressure is connected so as to act through the breather/equalizer and be repeated directly within the sensor interior. The sensor sheaths, feeling the same pressure on both interior and exterior surfaces, are thus neutral thereto and feel only the hydrostatic pressure exerted by presence of material on the immersed portion of the sensing tape.

Figure 4C:
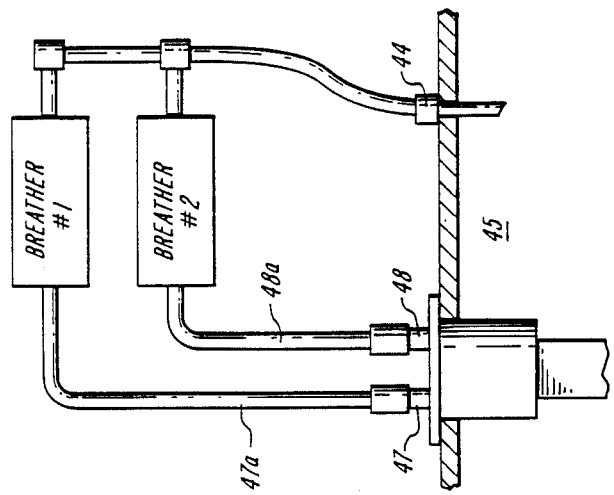
FIGS. 4A, 4B and 4C depict, in schematic form, the venting means including the breather/equalizer assemblies commonly used with the resistance-tape sensor, and show alternative attachments of sensor breather tubes to exterior breather assemblies.
Figure 4B:
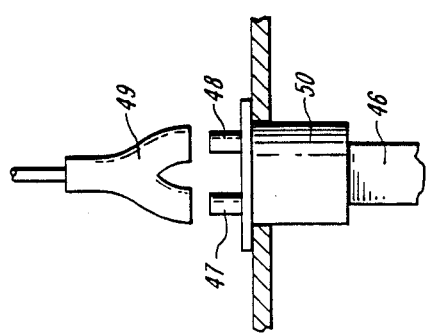
Figure 4A:
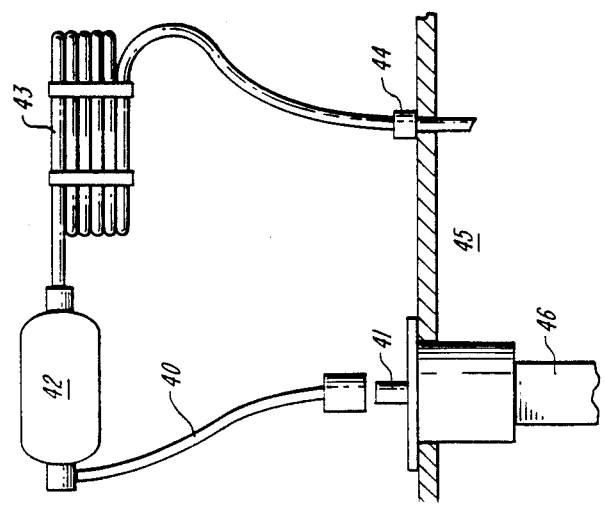

The breather/equalizer assembly is shown in rudimentary form in FIG. 4A. Here tubing 40 may be connected to a single breather tube 41 emanating from the top of the sensor head, and thereafter is connected to a desiccant cartridge 42, which contains cleaning, drying and chemical absorbent materials. From cartridge 42, connection is made to a coil 43 of small-bore tubing which is ultimately returned through a fitting 44 into the tank interior 45. The interior volume of cartridge 42 plus capillary coil 43 provides both a storage chamber and an extended pathway for isolating sensor 46 from moisture and corrosive vapors that may be present in tank space 45. From FIG. 4A, it can be seen that an extended labyrinthian path is created between the tank and its pressure and the interior of the sensor which may have a single chamber coupled to breather tube 41, or multiple chambers, as in FIG. 4B, coupled to breather tubes 47 and 48 by fitting 49. In addition, to best serve in its role of isolation, the breather/equalizer is designed to have an internal volume that well exceeds the total internal sensor volume, and thus can hold a fully conditioned gas volume for inhalation when tank material level is reduced to zero.

Figure 5:
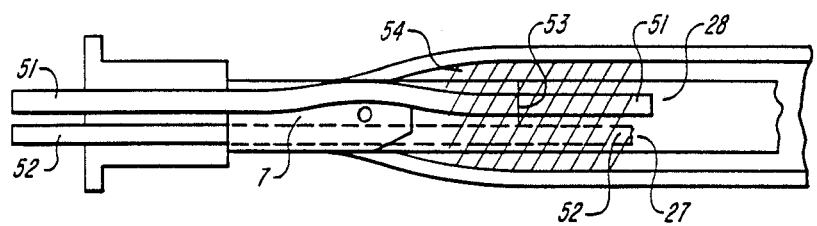
FIG. 5 shows the routing of sensor breather tubes from the sensor head into the internal chambers formed within the sensor.

Referring now to FIG. 5, the specific case of separate breather tubes from dual inner sensor chambers is illustrated, these chambers being the sensor interior space 28 and the interspace 27 between dual sheaths, as shown in the end view of FIG. 2. Tube 51 is shown passing through the sensor head and tongue 7, and then through slit 53 into the sensor interior space 28, within inner sheath 22 shown in FIG. 2. A second tube 52 shown in FIG. 5, also passes through the sensor head and tongue 7 on the underside of base strip 20, into the interspace 27 formed between sheaths 23 and 24. In order to separate sensor interior space 28 and sheath interspace 27, a sealing compound 54 is molded around the tubes and over the location of slit 53, forcing interspace 27 to respirate through tube 51.

An illustration of sensor head 50 with two separate and isolated breather tubes 47 and 48 is shown in FIG. 4C, and these tubes may each have their own separate breather structures coupled via tubing 47a and 48a, with both breathers eventually returned through a fitting 44 to tank space 45. FIG. 5 shows how dual breather tubes 51 and 52 may be returned to two separate and internal sensor chambers respectively interspace 27 between first and second sensor sheaths, and sensor interior space 28, with tube 52 reaching this space through jacket slit 53 and sealed at the point of entry with a compliant film patch or a moldable and adhesive compound.

When gauged liquid level is lowered in the storage tanks, residual gas held in the connecting tubes, such as 47a and 48a of FIG. 4C, is returned to the two inner sensor chambers and includes any corrosive permeant that may have migrated into the chambers and not captured by the drying and absorbent chemicals held in the breather desiccant cartridges. It is thus beneficial to minimize the internal volume of breather connection tubes 47a and 48a, and to maximize the expulsion of permeant vapor with each respiration cycle.

Other options exist for the dual breather tube configuration of FIGS. 4B and 4C. For example, the tubes 47 and 48 can be joined to a Y-connection 49, and thereby to a single breather via connection tube 40. Or tubes 47 and 48 can be coupled into a single breather at different points of entry, thus achieving some isolation of tube 47 from tube 48, while still enjoying the simplicity and economies of a single breather structure.

Figure 6:
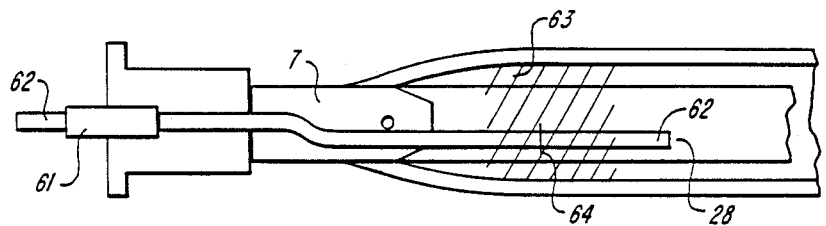
FIG. 6 shows an alternative use of concentric tubes to communicate with interior chambers formed within the subject sensor.

An alternative configuration falling within the scope of the invention is shown in FIG. 6. Here, concentric tubes comprised of exterior tube 61 surrounding a smaller interior tube 62 are illustrated. The larger tube 61 couples into the chamber of the sensor head, and thereafter along tongue 7 to the sensor interspace 27. The smaller tube 62 enters through the bore of tube 61 and continues through a shaped dam of sealing compound 63 and through slit 64 into the sensor interior chamber 28.

If concentric breather tubes 61 and 62, emerging from the sensor head, are attached to a single breather assembly, this merging is brought as close to the breather as practical so as to minimize the volume of residual permeant vapor that may persist and be carried over from interspace 27 to the critical sensor interior space 28. With the volume of interspace 27 being nearly double that of the sensor interior 28, residual vapor will divide in approximately that ratio, with the bulk being returned to the less critical sheath interspace, which is designed to be generally corrosion resistant.

While the use of dual breather tubes and separate breather assemblies provides maximum isolation of the sensor interior chambers, it has been found that, by the selection of good isolating membranes for outer and inner sensor sheaths and the sealing of resultant chambers from one another, effective operation and satisfactory sensor longevity can be achieved. For certain gauged materials, however, found to be highly prone to the penetration of thin jacket membranes, maximum isolation measures need to be employed.

The structures shown in the illustrations herein, and described in the accompanying text, are examples of configurations that fall within the broader scope of the subject invention. A resistance-tape sensor may, of course, have more than two enclosing sheaths and thus more than two interior chambers. Sensor sheaths may be of a wide range of configurations and constructions, and may include layers that are highly effective in the isolation of tank liquid and vapors, and thus restrictive of liquid and vapor penetration.

Other configurations incorporating similar principles and practices are deemed to fall within the spirit of this invention. Moreover, the invention is applicable to tape-like sensors of other than resistance tape (or Metritape) form, and these sensors may be used for other than level sensing. Accordingly, the invention is not to be limited except as indicated in the appended claims.

What is claimed is:

1. An elongated resistance-tape level sensor disposable within a vessel containing a fluent material the level of which is to be monitored, and operative in response to the pressure of materials surrounding the immersed sensor to provide an electrical resistance proportional to material level, said sensor comprising:
    an elongated metallic base strip, electrical insulation on the edges and back of the strip defining an uninsulated zone along the frontal length of the strip, and a resistance wire helically wound around the insulated base strip with the helical turns bridging the insulated edge portions and being spaced from the underlying uninsulated frontal zone of the base strip;
    a first continuous flexible protective sleeve enclosing the resistance tape sensor along its entire operative length defining a first inner chamber along the length between said first sleeve and said base strip and fully closed at the bottom end, and operative to protect against the intrusion of corrosive liquids and vapors;
    a second continuous flexible protective sleeve enclosing the first protective sleeve and extending along the entire length of the first sleeve defining a second inner chamber along the length between said first sleeve and said second sleeve and fully closed at the bottom end, and having a flattened configuration generally conforming to the cross section of the sensor and the first sleeve and having opposite edges operative to provide mechanical bumpers;
    a mounting head for disposing the sensor in a working environment within the vessel and connected to the upper end of the sensor base strip;
    at least one venting means extending through the mounting head and coupling said first and second inner chambers of the sensor sleeves to the working environment surrounding said mounting head and operative to equalize the pressure within said first and second inner chambers with that of the pressure of the working environment surrounding said mounting head and to expell permeant vapors which can occur as a result of the cycling of fluent material within the vessel; and
    leadwires from the resistance wire and the base strip extending through the mounting head for connection to external circuitry.

2. The sensor of claim 1 wherein the mounting head includes a tongue extending from the head and having an outer end connected to the base strip of the sensor;
    at least the first surrounding sleeve extending over the tongue;
    means in the head for providing a compression seal around the confronting end of the sleeve.

3. The sensor of claim 1 wherein the first sleeve has a metallic layer thereon.

4. The sensor of claim 1 wherein:
    the second sleeve has a generally oval chamber for accomodation of the sensor and first sleeve.

5. The sensor of claim 4 wherein:
    the side edges of the second sleeve can accomodate split tubing for further edge protection.

6. The sensor of claim 1 wherein:
    the bottom end of the first sleeve extends beyond the sensor bottom end and is folded over the sensor bottom end and sealed.

7. The sensor of claim 1 wherein:
    the second sleeve resists corrosion by liquids and vapors to which they are exposed and minimizes absorption and permeation of liquids and vapors;
    the second sleeve also being compliant and capable of delivering surrounding hydrostatic pressure to the resistance turns of the sensor.

8. The sensor of claim 1 wherein at least one of the sleeves is composed of multiple layers of material fused together.

9. The sensor of claim 1 further including edge bumpers connected to the edges of the second sleeve.

10. The sensor of claim 1 including:
    a surrounding sheath at the bottom sensor and sealed around the bottom sensor end.

11. The sensor of claim 1 wherein both the first and second sleeves are formed of composite layers.

12. The sensor of claim 1 wherein the second sleeve is formed into a sealed boot having sealed edges and bottom.

13. The sensor of claim 12 wherein the second sleeve is formed of two layers sealed at the edges.

14. For use with elongated resistance-tape level sensor disposable within a vessel containing a fluent material the level of which is to be monitored, and operative in response to the pressure of materials surrounding the immersed sensor to provide an electrical resistance proportional to material level, a sensor structure comprising:
    a first continuous flexible protective sleeve enclosing the resistance tape sensor along its entire operative length defining a first inner chamber along the length between said first sleeve and said base strip and fully closed at the bottom end, and operative to protect against the intrusion of corrosive liquids and vapors;

a second continuous flexible protective sleeve enclosing the first protective sleeve and extending along the entire length of the first sleeve defining a second inner chamber in the length between said first sleeve and said second sleeve and fully closed at the bottom end, and having a flattened configuration generally conforming to the cross section of the sensor and the first sleeve and having opposite edges operative to provide mechanical bumpers;

a mounting head for disposing the sensor in a working environment within the vessel, said head being connected to the upper end of the sensor base strip;

at least one venting means extending through the mounting head and coupling said first and second inner chambers to the working environment surrounding said mounting head and operative to equalize the pressure within said first and second inner chambers with that of the pressure of the working environment surrounding said mounting head and to expell permeant vapors which can occur as a result of the cycling of fluent material within the vessel.

* * * * *